(12) United States Patent
Colson et al.

(10) Patent No.: US 8,083,236 B2
(45) Date of Patent: Dec. 27, 2011

(54) STAGGERED SEAL ASSEMBLY

(75) Inventors: Darryl A. Colson, West Suffield, CT (US); Craig M. Beers, Wethersfield, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 50 days.

(21) Appl. No.: 12/564,521

(22) Filed: Sep. 22, 2009

(65) Prior Publication Data
US 2011/0068540 A1    Mar. 24, 2011

(51) Int. Cl.
*F16J 15/447* (2006.01)
(52) U.S. Cl. .................. 277/418; 277/419; 277/420
(58) Field of Classification Search .......... 277/418–420
See application file for complete search history.

(56) References Cited

U.S. PATENT DOCUMENTS

| | | | |
|---|---|---|---|
| 1,111,312 A * | 9/1914 | Ljungstrom | 277/419 |
| 2,123,818 A * | 7/1938 | Wegmann | 277/419 |
| 3,594,010 A * | 7/1971 | Warth | 277/413 |
| 3,867,060 A * | 2/1975 | Huber | 415/173.5 |
| 4,867,633 A | 9/1989 | Gravelle | |
| 4,932,207 A | 6/1990 | Harris et al. | |
| 5,599,026 A * | 2/1997 | Sanders et al. | 277/415 |
| 5,738,490 A | 4/1998 | Pizzi | |
| 5,762,472 A | 6/1998 | Pizzi et al. | |
| 5,890,873 A * | 4/1999 | Willey | 415/173.5 |
| 5,961,279 A | 10/1999 | Ingistov | |
| 5,988,975 A | 11/1999 | Pizzi | |
| 6,139,019 A * | 10/2000 | Dinc et al. | 277/355 |
| 6,220,603 B1 * | 4/2001 | Brandon et al. | 277/419 |
| 6,767,182 B2 | 7/2004 | Coppola | |
| 7,059,827 B1 | 6/2006 | Ingistov | |
| 7,217,089 B2 | 5/2007 | Durocher et al. | |
| 7,296,415 B2 | 11/2007 | Coulon et al. | |
| 7,540,708 B2 | 6/2009 | Laurer et al. | |
| 7,704,041 B2 * | 4/2010 | Adis | 415/174.5 |

* cited by examiner

*Primary Examiner* — Alison Pickard
(74) *Attorney, Agent, or Firm* — Carlson, Gaskey & Olds, PC

(57) ABSTRACT

An improved staggered seal assembly uses a static element and a rotating element to create a seal. The static element surrounds the rotating element and has at least one fin. The rotating element has at least one long fin and a set of shorter fins. A third component has a staggered fin. The fins create a leakage flow path which throttles the leakage across the seal from a high pressure zone into a low pressure zone.

6 Claims, 4 Drawing Sheets

STAGGERED SEAL ASSEMBLY

BACKGROUND OF THE INVENTION

The present application is directed to an improved labyrinth seal design, and more specifically to a labyrinth seal design which hybridizes known straight through seal designs and known staggered seal designs.

Air flow management machines such as fans, turbines, and compressors typically have rotating air seals which separate areas of high fluid pressure and low fluid pressure within the machine. As a result of the rotation, it is not possible to create a perfect seal which prevents 100% of the leakage which could occur between the high pressure area and the low pressure area. The path which the fluid travels when it leaks from the high pressure area to the low pressure area is referred to as the "leakage flow path."

In order to reduce the amount of fluid which can flow across the leakage flow path, two types of seals have been used in the prior art. The first type of seal uses a straight leakage flow path and is referred to as a straight through seal. The straight leakage flow path has a large amount of leakage relative to other types of seals. However, it is easy to assemble and is constructed out of significantly simpler and cheaper components than other known seals.

The second type of seal used in the prior art is a staggered seal. The staggered seal creates a flow path which is significantly more restricted than the flow path of a straight through seal. The staggered seal uses a series of fins on the static element and a series of fins on the rotating element within the seal. The fins alternate, with each fin from the rotating element being adjacent to two fins from the static element. This forces the leakage flow path to travel a more complex, winding, pathway and results in a decrease in pressure leakage between the high pressure area and the low pressure area, relative to the straight-through design, due to the leakage flow path being throttled.

The staggered seal design is significantly more complicated to construct, as the fins must be arranged in the correct pattern and have a tight tolerance. The staggered seal additionally uses more expensive components and a greater quantity of components. These two features combined result in the staggered seal assembly costing significantly more to manufacture and assemble than other less complicated seal designs.

SUMMARY OF THE INVENTION

Disclosed is a seal assembly having a rotating element contained within a static sealing element. Adjacent to the static sealing element is a staggered element, which also surrounds the rotating element. The static element has at least one fin, which extends radially inward toward the rotating element, and the rotating element has at least one fin, which extends radially outward from the rotating element. The staggered element has at least one fin, which extends radially outward from the rotating element, toward the static element.

Also disclosed is a cylindrical seal having a plurality of notches and at least one fin. The seal is cylindrical with an interior through hole extending axially through the cylinder.

These and other features of the present invention can be best understood from the following specification and drawings, the following of which is a brief description.

DETAILED DESCRIPTION OF THE PREFERRED EMBODIMENT

Figure 1:
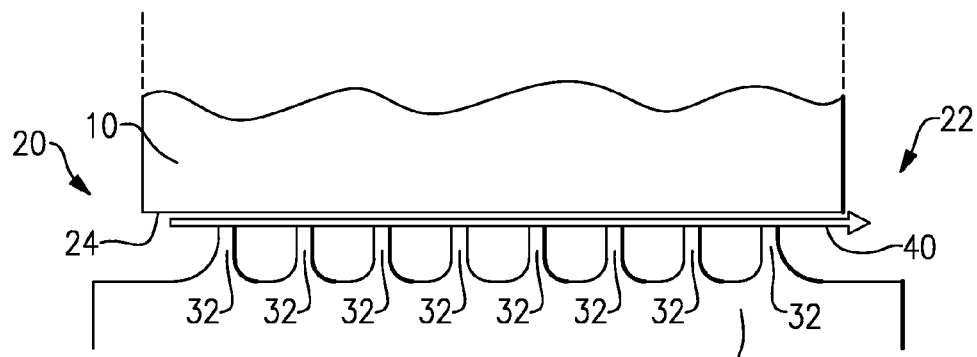
FIG. 1 illustrates a prior art labyrinth seal utilizing a straight through leakage path.
Figure 2:
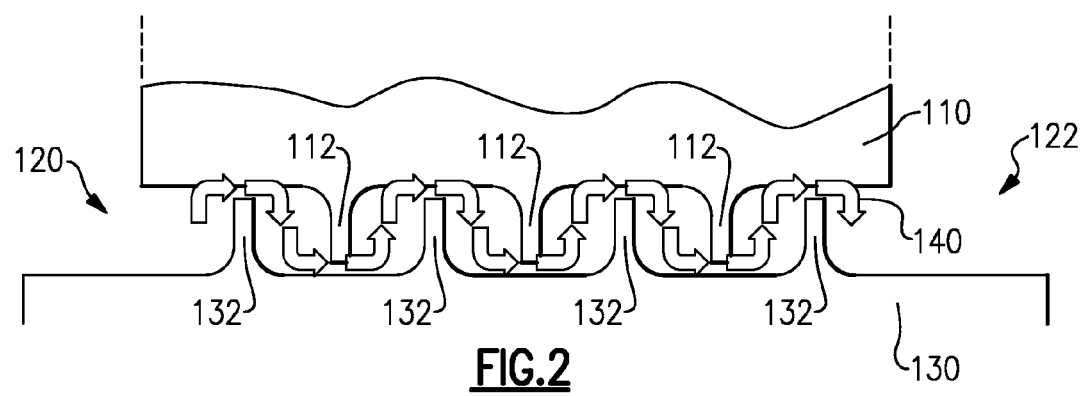
FIG. 2 illustrates a prior art labyrinth seal utilizing a staggered leakage path.

FIGS. 1 and 2 illustrate prior art labyrinth seals. FIG. 1 illustrates a labyrinth seal which has a static element 10 separating a high pressure region 20 from a low pressure region 22. The static element radially surrounds a rotating element 30. The rotating element 30 has a set of fins 32. The fins 32 are adjacent to an edge 24 of the static element 10. The gap between the fins 32 and the static element 10 is a leakage flow path 40, which allows a portion of the fluid in the high pressure region to leak into the low pressure region 22. The fins 32 and the leakage flow path 40 of FIG. 1 are enlarged for illustration purposes.

As an alternate to the straight through seal illustrated in FIG. 1, some prior art systems use a staggered seal assembly such as the one illustrated in FIG. 2. The staggered seal assembly has a static element 110 with fins 112 protruding radially inward toward a rotating element 130. The rotating element 130 also has fins 132, which extend radially outward toward the static element 110. The static element fins 112 and the rotor fins 132 are arranged in an alternating pattern with a gap between them to create a complex leakage flow path 140. The complex leakage flow path 140 results in a slower leakage from a high pressure zone 120 to a low pressure zone 122 than exists in the straight through leakage path of FIG. 1. As in FIG. 1, the fins 112, 132 and the leakage flow path are enlarged for illustrative purposes.

Figure 3:
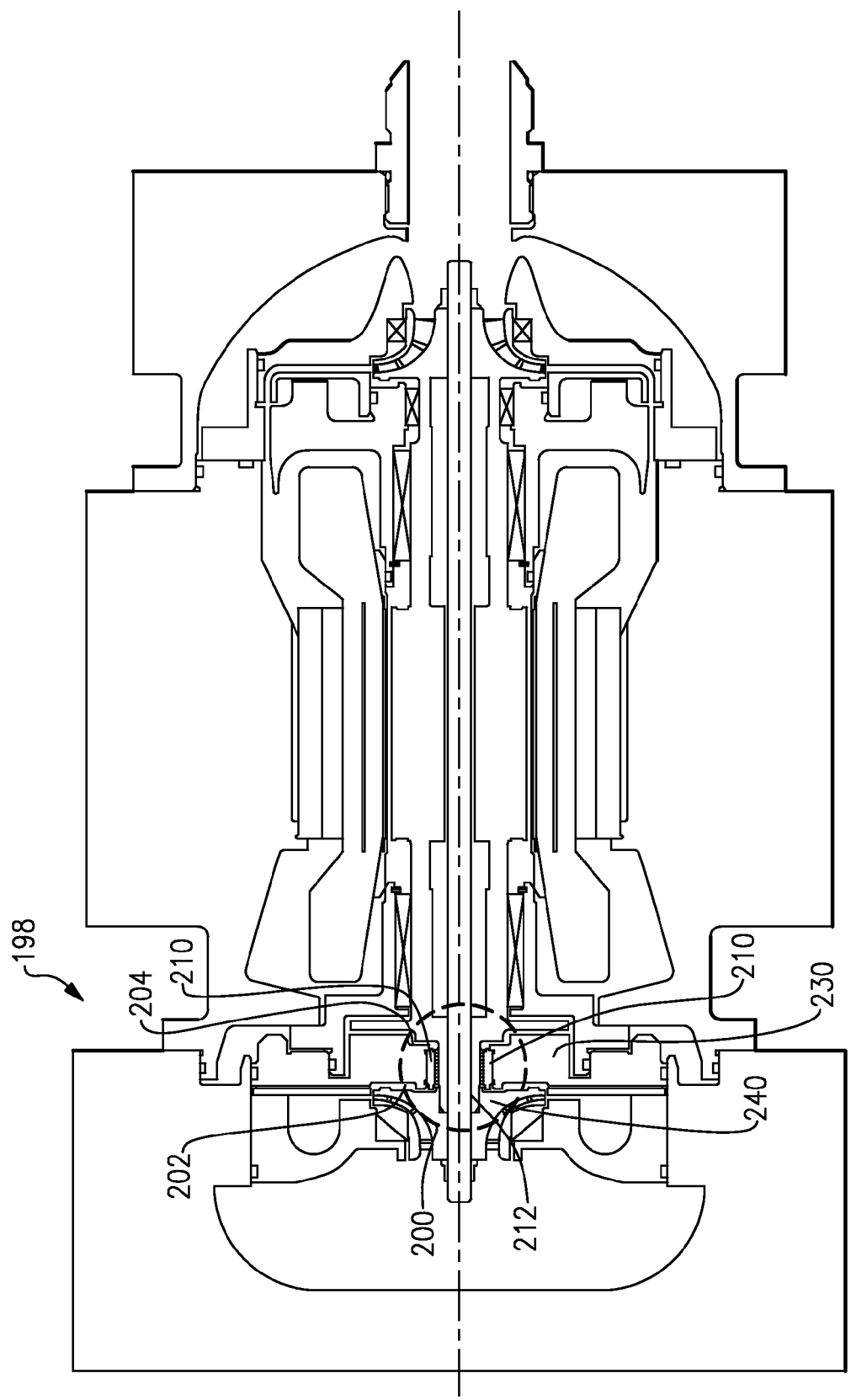
FIG. 3 illustrates a vapor cycle compressor utilizing an improved staggered seal assembly.

FIG. 3 illustrates a schematic vapor cycle compressor 198 which utilizes an improved staggered seal assembly 200. The seal assembly 200 has a static element 210 which creates the seal, and limits airflow from a high pressure side 202 of the seal to a low pressure side 204 of the seal. The static element 210 is ring shaped and surrounds the shaft 212. The static element 210 is held in place by contact with a thrust plate 230. An impeller 240 is connected to the shaft 212 and rotates along with the shaft 212. The impeller 240 also provides a staggered component 340 (pictured in FIG. 4), which aids in the formation of the seal. The seal assembly 200 has a leakage path which allows a portion of the fluid in the high pressure side 202 to travel through a gap between the static element 210 and the rotor 212 to the low pressure side 204.

Figure 4:
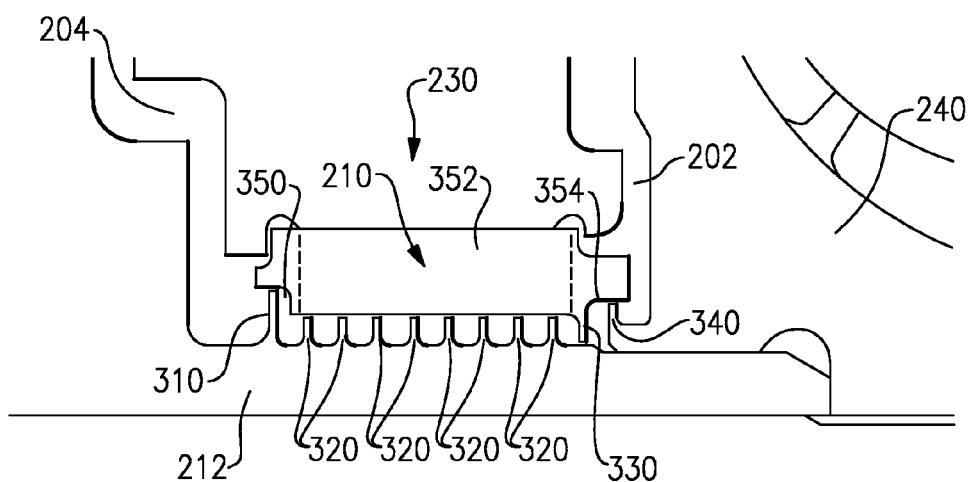
FIG. 4 illustrates the hybrid staggered seal assembly of the vapor cycle compressor of FIG. 3 in greater detail.

As can be appreciated from FIGS. 3 and 4, the seal assembly 200 can be assembled by sliding the static element 210 up the shaft 212 until the static element 210 is in place. The thrust plate 230 then contacts the static element 210 and secures the static element 210, preventing the static element 210 from moving. The impeller 240 is then installed contacting the shaft 212 with a staggered element 340 (pictured in FIG. 4) adjacent to the static element 210 to further stagger the leakage flow path. This installation technique allows the static element 210 to be constructed out of a single piece, thereby reducing the component costs and construction time of the seal assembly 200 relative to prior art staggered seal designs. Additionally the use of a single piece for the static element 210 allows the static element 210 to be replaceable after the static element 210 is worn out, thereby allowing the seal assembly 200 to have a greater lifespan.

The static element 210 and the shaft 212 separate the high pressure side 202 from the low pressure side 204 through the use of several fins 310, 320, 330, 340. The shaft 212 has a first shaft fin 310 and a set of second shaft fins 320. The first shaft fin 310 extends farther away from the shaft 212 and into a notch 350 of the static element 210. The set of second shaft fins 320 extend away from the shaft 212 toward the static element 210 along a center portion 352 of the static element 310. The static element 210 has a static fin 330, which extends radially inward from the static element 210 toward the shaft 212. Adjacent to the static fin 330 is a staggered element fin 340. The staggered element fin 340 extends radially outward from the shaft 212 into a second notch 354 of the static element 210, and is connected to the impeller 240. In alternate applications the staggered element fin 340 could be attached to any component, which is adjacent to the high pressure side 202 of the static element 210, and which rotates along with the shaft 212.

The static element 210 is radially thinner in the notches 350, 354 than in the center portion 352. This allows the fins 310, 320, 330, 340 to create a staggered leakage flow path (illustrated in FIG. 5) while simultaneously allowing for easier manufacturing and construction of the seal assembly 200 than the prior art staggered seal assemblies. The first notch 350 and the second notch 354 further allow the first sized rotor fin 310 (in the case of the first notch 350) and the staggered component fin 340 (in the case of the second notch 354) to freely rotate without intersecting the static element 210. While the illustration of FIG. 4 shows a cut-out sectional view of the static element 210, an actual staggered seal assembly 200 will have the static element 210 radially surrounding the rotor in a uniform shape such that the cross-sectional view would be the same, regardless of where the cross-section was taken (see FIG. 6).

Figure 5:
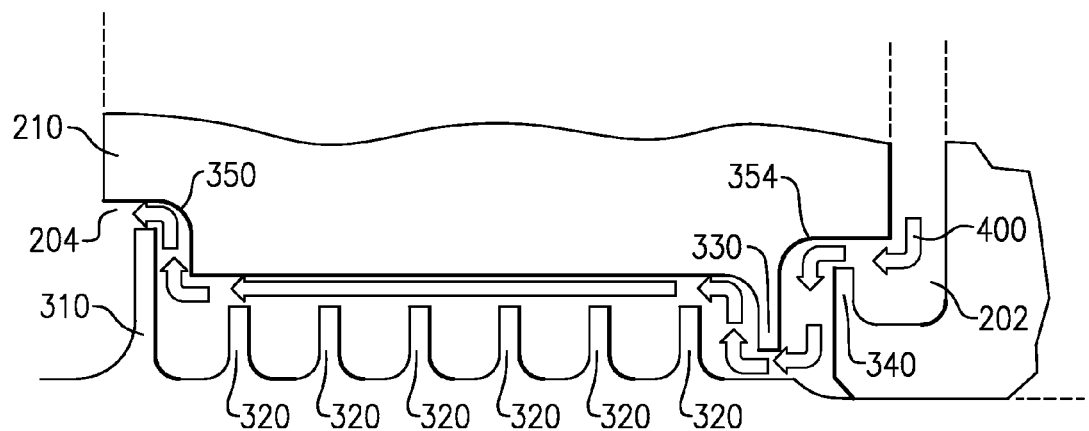
FIG. 5 illustrates a cut view of a cylindrical seal for use with the seal assembly of FIG. 4.

FIG. 5 illustrates an enlarged view of a portion of the seal assembly 200, which illustrates the leakage flow path 400 using a series of arrows. The leakage flow path 400 is forced in a staggered path around the fins 310, 320, 330, 340 as it progresses from the high pressure side 202 to the low pressure side 204 of the static element 210. This configuration achieves the benefits of the prior art staggered seal assembly (illustrated in FIG. 2) by forcing the leakage fluid through a winding path, while at the same time maintaining the ease of construction found in the prior art strait through seal assembly (illustrated in FIG. 1).

Figure 6:
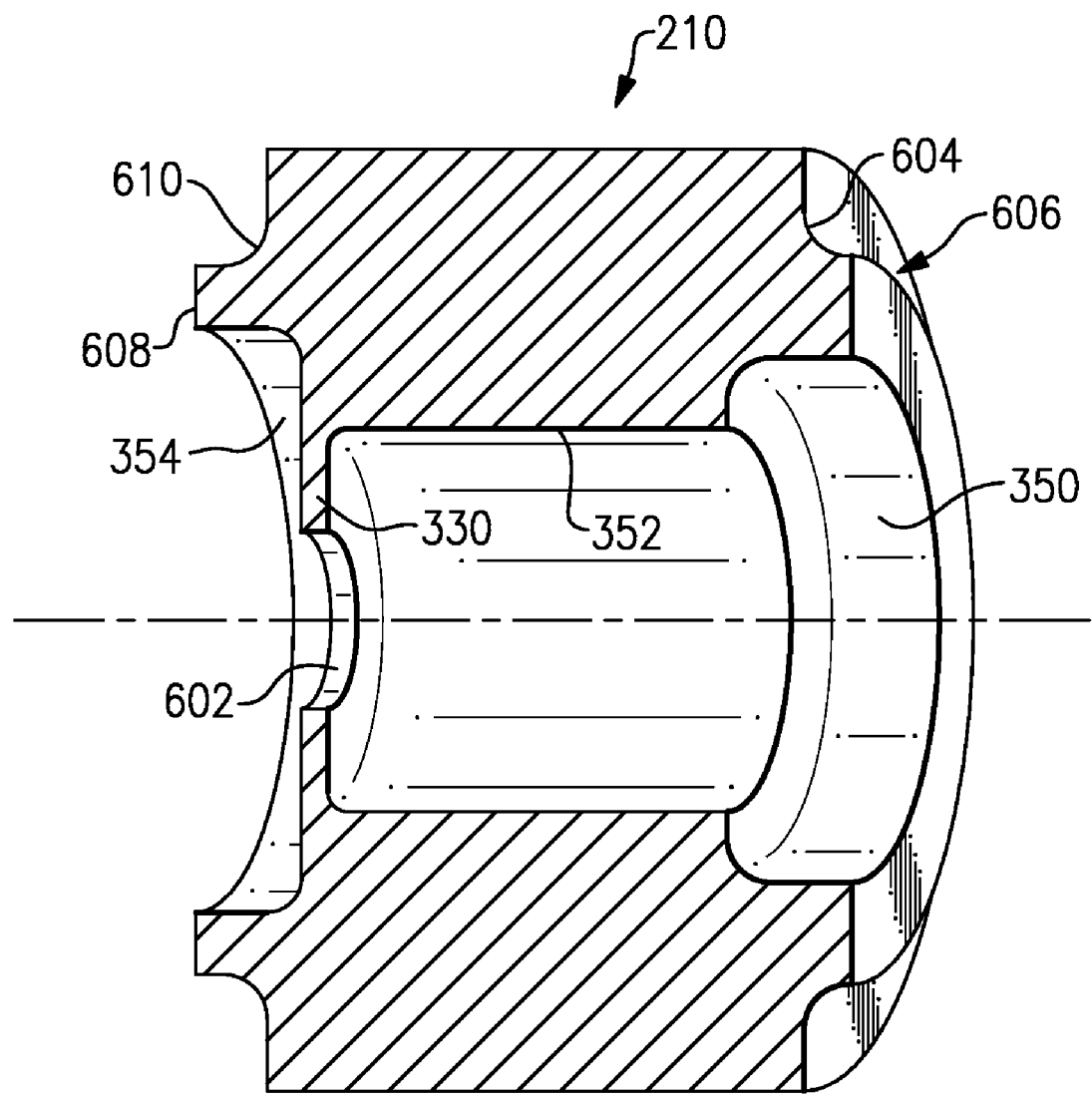
FIG. 6 illustrates a 3 dimensional view of the cylindrical seal of FIG. 5.

FIG. 6 illustrates a three dimensional view of the static element 210. The static element 210 has a through hole 602 which, when the static element 210 is installed, fits the shaft 212 with a gap between the static element fin 330 and the shaft 212. A first end 606 of the static element 210 has the first notch 350 and a third notch 604. A second end 608 of the static element 210 has the second notch 354 and a fourth notch 610. The third notch 604 and the fourth notch 610 allow another static component of the seal assembly 200 (pictured in FIG. 3) to grip the static element 210 and hold the static element 210 in a stationary position while the shaft 212 rotates within the through hole 602. The static element fin 330 extends from the border between the second notch 354 and the central portion 352 of the static element 210. The first notch 350 and the second notch 354 allow the first rotor fin 310 (pictured in FIG. 4) and the staggered element fin 340 (pictured in FIG. 4) to rotate freely without intersecting the static element 210.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. An improved staggered seal assembly comprising:
a rotating element having at least one first elongated fin which extends radially outward from said rotating element said rotating element comprising a plurality of rotating fins extending radially outward from said rotating element, and wherein said at least one first elongated rotating fin extends radially further outward from said rotating element than said plurality of rotating fins;
a static element radially surrounding said rotating element and having a first notch, said first notch on a first end of said static element, wherein said first notch comprises a region of said static element having a reduced radial thickness;
said static element comprising at least one first static fin extending radially inward toward said rotating element, at least one first staggered fin extending radially outward from said rotating element, adjacent to said static element and radially surrounding said rotating element; and
wherein said at least one first elongated rotating fin extends radially into said first notch.

2. An improved staggered seal assembly comprising:
a rotating element having at least one first elongated fin which extends radially outward from said rotating element said rotating element comprising a plurality of rotating fins extending radially outward from said rotating element, and wherein said at least one first elongated rotating fin extends radially further outward from said rotating element than said plurality of rotating fins;
a static element radially surrounding said rotating element and having a first notch, said first notch on a first end of said static element, wherein said first notch comprises a region of said static element having a reduced radial thickness;
said static element comprising at least one first static fin extending radially inward toward said rotating element, at least one first staggered fin extending radially outward from said rotating element, adjacent to said static element and radially surrounding said rotating element; and
said at least one staggered fin extends radially into said second notch.

3. A seal comprising:
a cylindrical member having a first end and a second end axially opposite the first end;
a through hole extending axially from said first end to said second end;
a first notch on said first end wherein said first notch defines a portion of said cylindrical member which is radially thinner than a center portion of said cylindrical member;
a second notch wherein said second notch defines a portion of said cylindrical member which is radially thinner than said center portion of said cylindrical member; and
at least a first fin extending radially from said center portion, said first fin defining an axially inward edge of said second notch; and
said cylindrical member comprises a third notch, said third notch located on said first end at a radially outer surface and said first notch is located at a radially inner surface of said cylindrical member.

4. The seal of claim 3, wherein said third notch defines a portion of said cylindrical member which is radially thinner than said center portion of said cylindrical member.

5. A seal comprising:
   a cylindrical member having a first end and a second end axially opposite the first end;
   a through hole extending axially from said first end to said second end;
   a first notch on said first end wherein said first notch defines a portion of said cylindrical member which is radially thinner than a center portion of said cylindrical member;
   a second notch wherein said second notch defines a portion of said cylindrical member which is radially thinner than said center portion of said cylindrical member; and
   at least a first fin extending radially from said center portion, said first fin defining an axially inward edge of said second notch; and
   said cylindrical member comprises a fourth notch, said fourth notch located on said second end at a radially outer surface and said second notch is located at a radially inner surface of said cylindrical member.

6. The seal of claim 5, wherein said fourth notch comprises a portion of said cylindrical member which is radially thinner than said center portion of said cylindrical member.

* * * * *